US011921466B2

(12) United States Patent
Lagorgette

(10) Patent No.: US 11,921,466 B2
(45) Date of Patent: Mar. 5, 2024

(54) UPDATING DEVICE AND METHOD THEREFOR

(71) Applicant: ETA SA MANUFACTURE HORLOGÈRE SUISSE, Grenchen (CH)

(72) Inventor: Pascal Lagorgette, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 345 days.

(21) Appl. No.: 17/233,736

(22) Filed: Apr. 19, 2021

(65) Prior Publication Data

US 2021/0397134 A1 Dec. 23, 2021

(30) Foreign Application Priority Data

Jun. 18, 2020 (EP) .................................... 20180690

(51) Int. Cl.
*G04C 17/00* (2006.01)

(52) U.S. Cl.
CPC ....... *G04C 17/0066* (2013.01); *G04C 17/005* (2013.01); *G04C 17/0058* (2013.01); *G04C 17/00* (2013.01)

(58) Field of Classification Search
CPC ............ G04C 17/0066; G04C 17/0058; G04C 17/005; G04C 17/00
See application file for complete search history.

(56) References Cited

U.S. PATENT DOCUMENTS 4,815,051 A * 3/1989 Schmidli ................ G04C 17/00 968/572
5,305,289 A 4/1994 Besson et al.
6,278,661 B1 * 8/2001 Higuchi ................... G04C 3/14 368/35
6,582,118 B1 * 6/2003 Nakajima .......... G04C 17/0066 368/37
7,616,527 B2 * 11/2009 Tamura .................. G04C 3/146 368/37
2001/0028605 A1 10/2001 Higuchi et al.
2003/0198139 A1 10/2003 Kitahara et al.
2005/0185513 A1 8/2005 Tamura et al.
2018/0143590 A1 5/2018 Kim

FOREIGN PATENT DOCUMENTS

KR 10-2016-0131864 A 11/2016

OTHER PUBLICATIONS

European search report for application EP 20 18 0690 dated Nov. 11, 2020.

* cited by examiner

*Primary Examiner* — Edwin A. Leon
*Assistant Examiner* — Sean R Brannon
(74) *Attorney, Agent, or Firm* — Sughrue Mion, PLLC

(57) ABSTRACT

A method for updating (500) the date for a watch implemented by an updating device (100). The updating method (500) including storing in memory the current date (171) according to a perpetual calendar programmed on a time zone (175), receiving a second signal (181) before verifying a first signal (131) after having received the second signal (181). A comparison is carried out between the second signal (181) and the current date (171) in order to control the driving of at least one date-disc (120) with a drive member (160) if the second portion (127) is different from the current date (171) until the first sensor (130) detects a first portion (126) of the at least one date-disc (120).

10 Claims, 3 Drawing Sheets

UPDATING DEVICE AND METHOD THEREFOR

CROSS-REFERENCE TO RELATED APPLICATIONS

This application claims priority to European Patent Application No. 20180690.8 filed on Jun. 18, 2020, the entire contents of which are incorporated herein by reference.

TECHNICAL FIELD

The present invention relates to an updating device and updating method.

TECHNOLOGICAL BACKGROUND

Most current quartz watches comprise a date-disc. Nevertheless, the user has to verify for certain ends of the month, such as that of February, April, June, September and November, if the date of the following month is correct, that is to say the date displayed is the "1$^{st}$" and not "29", "30" or "31".

Perpetual calendars exist, however, the algorithm and/or the watch is very complex because this requires envisaging all possible cases.

This becomes all the more complicated if the user changes time zone such as for example from Europe to Asia. In this case, the date change by the perpetual calendar is carried out before that of the internal clock which leads to an error that requires the intervention of the user.

SUMMARY OF THE INVENTION

The present invention proposes to resolve all or part of these drawbacks thanks to a device for updating the date for a watch; said updating device consisting of:

A memory; said memory being configured to transmit the current date according to a perpetual calendar programmed on a time zone;

At least one date-disc: said at least one date-disc consists of a first portion and a second portion;

A first sensor: said first sensor being configured to transmit a first signal when said first sensor detects said second portion;

A drive member: said drive member being configured to drive said at least one date-disc;

A second sensor: said second sensor being configured to transmit a second signal when said second sensor detects the driving of said at least one date-disc by said drive member; and A central unit: said central unit being configured to receive said second signal before comparing said first signal with the current date and controlling the driving of at least one date-disc with said drive member if said second portion is different from the current date until said first sensor detects said first portion of said at least one date-disc.

Thanks to this arrangement, the date change is carried out correctly and simply and this, regardless of the location of the user.

According to one embodiment, said time zone is a time zone from the time zone "+10", "+11", "+12", "+13" or "+14".

Thanks to this arrangement, the date change of the perpetual calendar of the internal clock of said memory is carried out first.

According to one embodiment, said at least one date-disc consists of a date-disc or of two date-discs; the two date-discs being a date unit disc and a date tens disc.

Thanks to this arrangement, the updating device operates for a date-disc or for a large date.

According to one embodiment, said first portion of said date-disc represents the dates 1 to 28 and said second portion of said date-disc represents the dates 29 to 31, or wherein said first portion of said two date-discs represents the date tens 0 and 1, and the date units 2 to 8, and said second portion of said two date-discs represents the date tens 2 and 3, and the date units 0, 1 and 9.

Thanks to this arrangement, it is possible to very simply differentiate the ends of short months, which do not include 31 days such as for example the month of February, April, June, September and November.

According to one embodiment, said first portion is different from said second portion.

According to one embodiment, said first sensor is a first optical sensor, a first resistive sensor, a first capacitive sensor and/or a first inductive sensor.

Thanks to one or other of these preceding arrangements, a single first sensor is sufficient for differentiating the first portion from the second portion.

According to one embodiment, said second sensor is a second optical sensor, a second resistive sensor, a second capacitive sensor and/or a second inductive sensor.

Thanks to this arrangement, it is possible to detect the date change carried out by said at least one date-disc.

According to one embodiment, said drive member is a motor.

Thanks to this arrangement, it is possible to drive said at least one date-disc.

The present invention relates to a method for updating the date for a watch implemented by an updating device according to the invention; said updating method consisting in:

Storing in memory the current date according to a perpetual calendar programmed on a time zone;

Receiving a second signal; said second signal being transmitted by a second sensor configured to detect the driving of at least one date-disc by a drive member;

Verifying a first signal after having received said second signal; said first signal being transmitted by a first sensor when said first sensor detects a second portion of said at least one date-disc;

Comparing said second signal with the current date;

Controlling the driving of said at least one date-disc with a drive member if said second portion is different from the current date until said first sensor detects a first portion of said at least one date-disc.

Thanks to this arrangement, the date change is carried out correctly and simply and this, regardless of the location of the user.

According to one embodiment, said time zone is a time zone from the time zone "+10", "+11", "+12", "+13" or "+14".

Thanks to this arrangement, the date change of the perpetual calendar of the internal clock of said memory is carried out first.

BRIEF DESCRIPTION OF THE FIGURES

The invention will be described hereafter in more detail using the appended drawings, given by way of non-limiting examples, wherein.

DETAILED DESCRIPTION OF THE INVENTION

The present invention enables a simple and exact date change and this, regardless of the location of the user. Indeed, quartz watches with a calendar are generally adjusted on the time zone wherein the battery change took place or on the time zone of the factory wherein it was designed. As soon as the user travels and changes time zone, this adjustment may incorrectly adjust the calendar function definitively, and does not enable it to operate during the ends of "short months". The difficulty is real, because in principle the watch does not know into which zone the user has travelled. The complexity appears when particular cases during trips are taken, particularly those that cross the date change line, such as for example in the case of a trip to Asia.

The present invention makes it possible for the watch to manage the ends of "short months", such as for example the month of February, April, June, September and November, with a single adjustment of the perpetual calendar during the battery change, and so long as the user has adjusted a time and a date corresponding to the zone wherein they are located, that is to say that where they live, or even that where they have just travelled to.

For this, the present invention is in the form of a device for updating 100 the date for a watch implementing an updating method 500.

Figure 1:
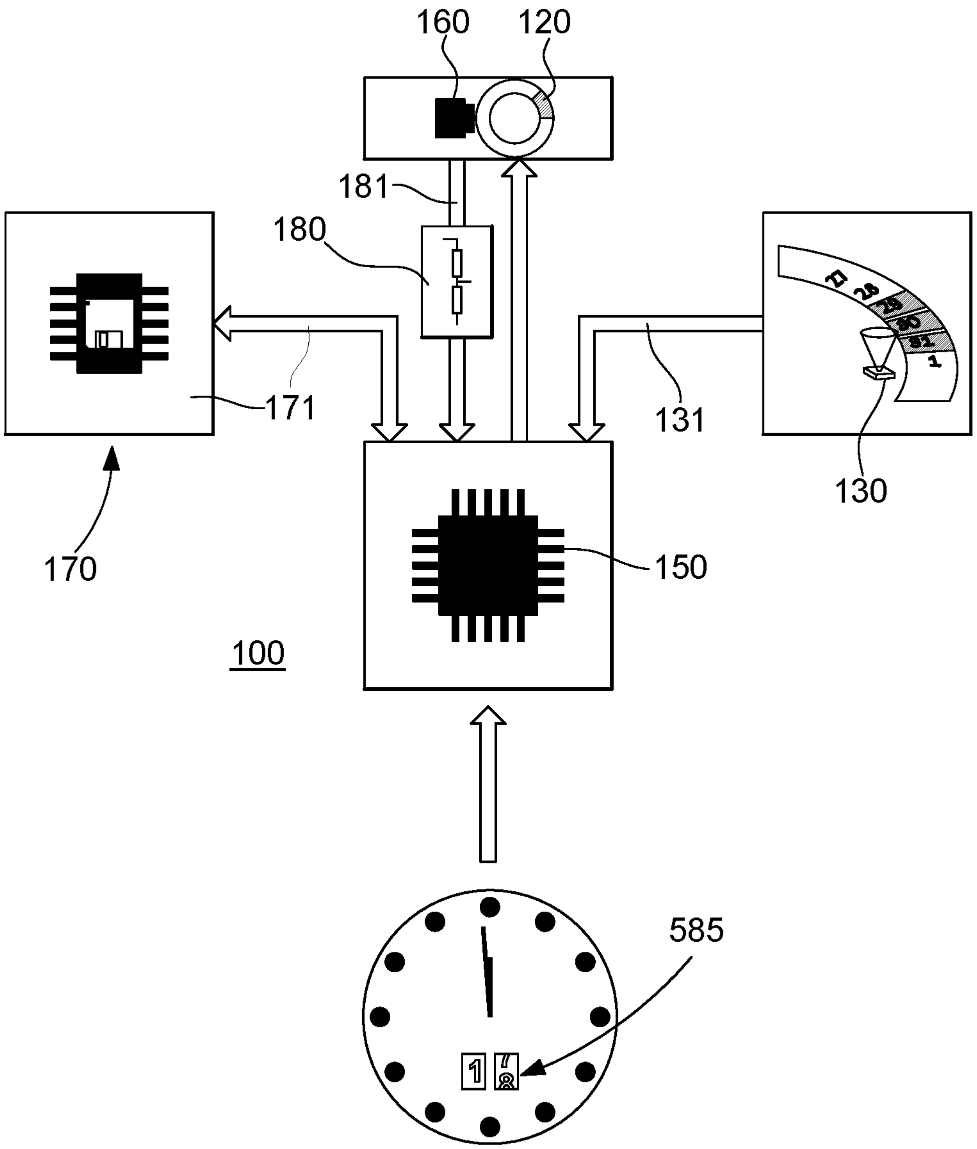
FIG. 1 shows a device for updating 100 the date for a watch according to one embodiment.

Said updating device 100, FIG. 1, only comprises a memory 170, at least one date-disc 120, a first sensor 130, typically a first optical sensor 130, a first resistive sensor 130, a first capacitive sensor 130 and/or a first inductive sensor 130, a drive member 160, a second sensor 180 and a central unit 150.

Figure 4:
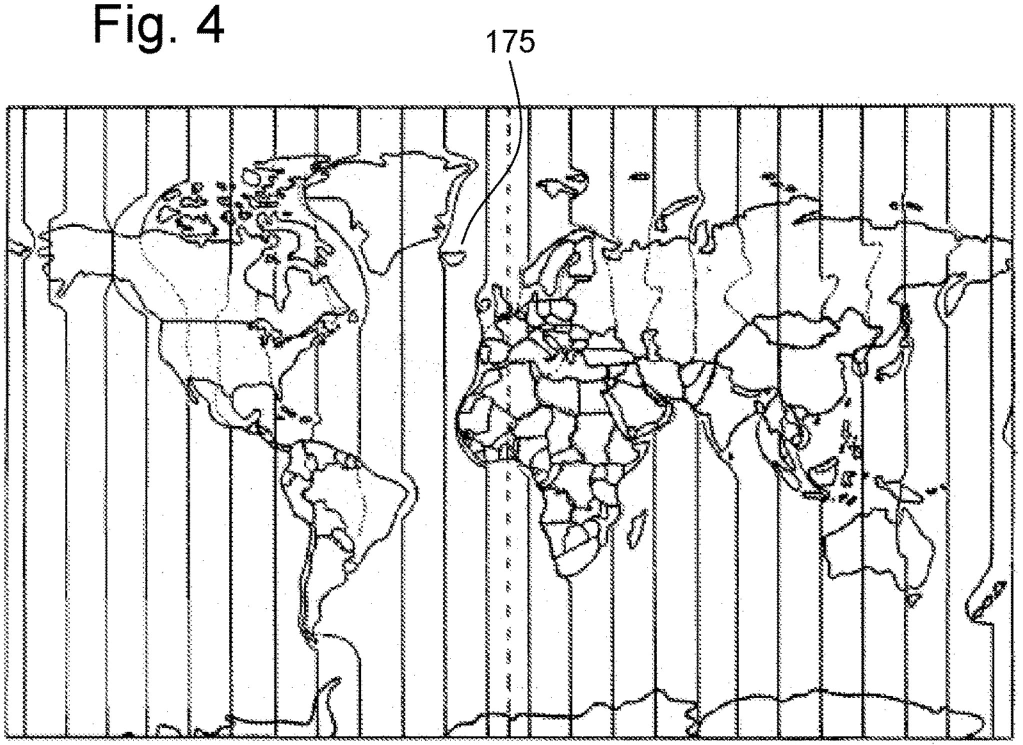
FIG. 4 shows a time zone map.
Figure 5:
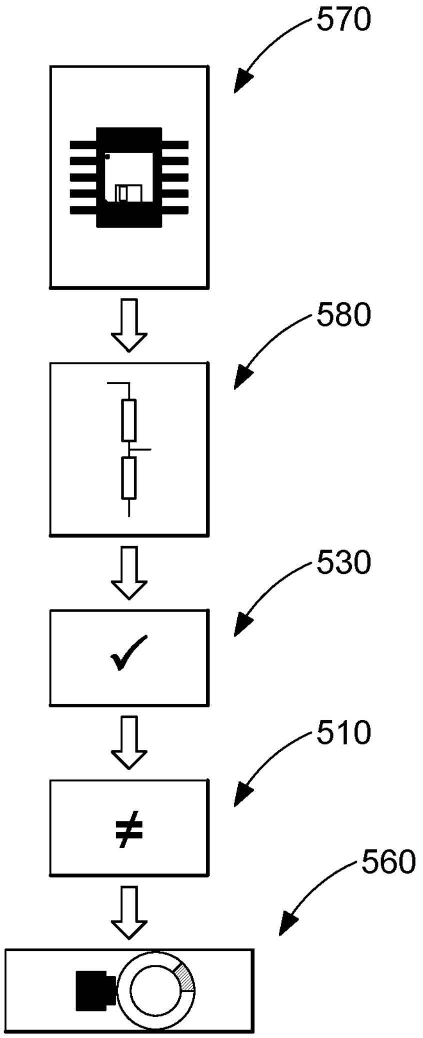
FIG. 5 presents a method for updating 500 the date for a watch implemented by an updating device 100 according to the invention.

During factory adjustments and even later, the current date 171 is stored in memory 570 according to a perpetual calendar programmed on a time zone 175 in said memory 170. Indeed, the perpetual calendar of the internal clock of said memory 170 transmits the current date 171 according to said time zone 175, which is a time zone 175 from the time zone 175 "+10", "+11", "+12", "+13" or "+14", which enables a date change of the perpetual calendar first especially when said time zone 175 is the time zone 175 "+13". Indeed, these time zones 175 are the first to change date, FIG. 4 and more particularly the time zone 175 "+13".

In FIG. 2A-3B said at least one date-disc 120 is represented that consists of a first portion 126 and a second portion 127. More precisely, in FIGS. 2A and 2B a date-disc 121 is illustrated and in FIGS. 3A and 3B two date-discs 122 for the "Large Date" displays with a date unit disc and a date tens disc.

Figure 2A:
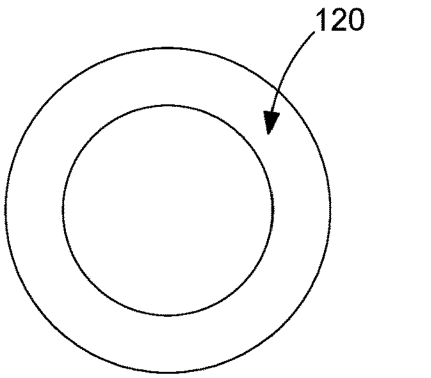
FIGS. 2A & 2B illustrate a date-disc 121 according to one embodiment.
Figure 3A:
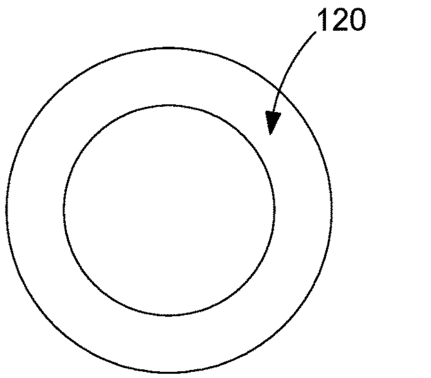
FIGS. 3A & 3B represent two date-discs 122 forming an large date according to one embodiment.
Figure 2B:
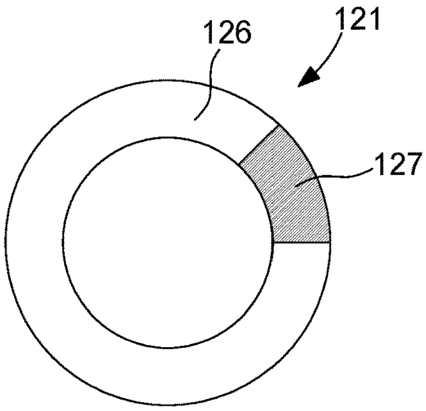
Figure 3B:
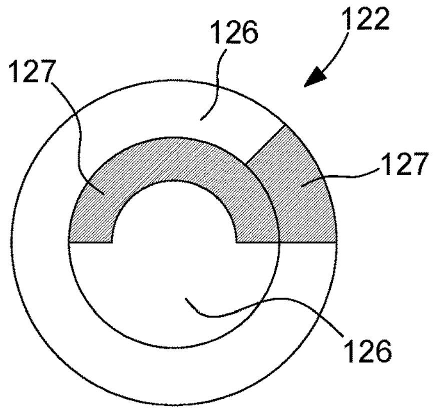

In the embodiment of FIGS. 2A and 2B, said first portion 126 of said date-disc represents the dates 1 to 28 and said second portion 127 of said date-disc represents the dates 29 to 31. Whereas in the embodiment of FIGS. 3A and 3B, said first portion 126 of said two date-discs 122 represents the date tens 0 and 1, and the date units 2 to 8, and said second portion 127 of said two date-discs 122 represents the date tens 2 and 3, and the date units 0, 1 and 9.

Given that said updating device 100 only comprises said first sensor 130, because it is sufficient for differentiating the first portion from the second portion that are different from one another, to transmit a first signal 131 when said first sensor 130 detects said second portion 127, if said first sensor 130 does not detect said second portion 127 of said two date-discs 122 no signal is transmitted. This makes it possible to very simply differentiate the ends of the months of February, April, June, September and November.

Said second portion 127 of said at least one date-disc 120 is brought opposite said first sensor 130 via said drive member 160, typically a motor 160, which is configured to drive said at least one date-disc 120.

Upon each date change, that is to say each time that said drive member 160 drives said at least one date-disc 120, said second sensor 180, typically a second optical sensor 180, a second resistive sensor 180, a second capacitive sensor 180 and/or a second inductive sensor 180, transmits a second signal 181 when a date jump is detected, that is to say when said second sensor 180 detects the driving 585 of said at least one date-disc 120 by said drive member 160. This detection happens when the date jump of the horological movement causes a torque increase then a sudden drop of said torque when the jump of said at least one date-disc 120 occurs, that is to say during the updating of the date displayed.

Said central unit 150 receives 580 said second signal 181 transmitted by a second sensor 180 and verifies 530 said first signal 131 transmitted by said first sensor 130 when said first sensor 130 detects a second portion 127 of said at least one date-disc 120. A comparison 510 of said second signal 181 with the current date 171 follows.

If said first sensor 130 detects said first portion 126, said central unit 150 will not react to this information. If on the contrary said first sensor 130 detects said second portion 127 and that the current date 171 does not correspond to an end of the month, that is to say if said first sensor 130 detects a date from "29", "30" and "31", via said second portion 127 and that the current date 171 is the "1St", said central unit 150 controls the driving of said at least one date-disc 120 with said drive member 160 until said first sensor 130 detects said first portion 126 of said at least one date-disc 120, which will also correspond to the "1$^{st}$".

The invention claimed is:

1. A device for updating a current date for a watch, said updating device comprising:

a memory configured to transmit the current date according to a perpetual calendar;

at least one date-disc including a first portion, representing dates 1 to 28, and a second portion representing dates 29 to 31;

a first sensor configured to transmit a first signal only when said first sensor detects said second portion;

a drive member configured to drive said at least one date-disc;

a second sensor configured to transmit a second signal when said second sensor detects the driving of said at least one date-disc by said drive member; and a central unit configured to receive said second signal before comparing said first signal with the current date and controlling the driving of said at least one date-disc with said drive member if said second portion is different from the current date until said first sensor no more transmits the first signal.

2. The updating device according to claim 1, wherein said time zone is "+10", "+11", "+12", "+13" or "+14".

3. The updating device according to claim 1, wherein said at least one date-disc comprises a date unit disc and a date tens disc.

4. The updating device according to claim 1, wherein said at least one date-disc is a single date-disc.

5. The updating device according to claim 1, wherein said first sensor is a first optical sensor, a first resistive sensor, a first capacitive sensor or a first inductive sensor.

6. The updating device according to claim 1, wherein said second sensor is a second optical sensor, a second resistive sensor, a second capacitive sensor or a second inductive sensor.

7. The updating device according to claim 1, wherein said drive member is a motor.

8. The updating device according to claim 1, wherein said at least one date-disc is a single date-disc, the first portion representing dates 1 to 28 and the second portion representing dates 29 to 31.

9. A method for updating the current date for a watch implemented by an updating device according to claim 1, said updating method comprising:

storing in memory the current date according to the perpetual calendar;

receiving the second signal;

verifying if the first signal is received after having received said second signal; and, if the first signal is received and said second portion is different from the current date stored in the memory, controlling the driving of said at least one date-disc with the drive member, until said first sensor no more detects the second portion of said at least one date-disc.

10. The updating method according to claim 9, wherein said time zone is "+10", "+11", "+12", "+13" or "+14".

* * * * *